United States Patent
Xiong

(10) Patent No.: US 9,366,908 B2
(45) Date of Patent: Jun. 14, 2016

(54) OPTICAL ALIGNMENT DEVICE AND THE METHOD THEREOF

(71) Applicant: Shenzhen China Star Optoelectronics Technology Co., Ltd., Shenzhen, Guangdong (CN)

(72) Inventor: Mei Xiong, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 519 days.

(21) Appl. No.: 13/985,805

(22) PCT Filed: Jun. 24, 2013

(86) PCT No.: PCT/CN2013/077750
§ 371 (c)(1),
(2) Date: Aug. 15, 2013

(87) PCT Pub. No.: WO2014/194538
PCT Pub. Date: Dec. 11, 2014

(65) Prior Publication Data
US 2014/0353520 A1    Dec. 4, 2014

(51) Int. Cl.
*G02F 1/1337* (2006.01)
*G02F 1/13* (2006.01)

(52) U.S. Cl.
CPC ........ *G02F 1/133753* (2013.01); *G02F 1/1303* (2013.01); *G02F 1/133788* (2013.01)

(58) Field of Classification Search
CPC ............ G02F 1/1303; G02F 1/133753; G02F 1/133788; G02F 1/133512; G02F 1/133362; G02F 2001/133761; G02F 2001/133757
See application file for complete search history.

(56) References Cited

U.S. PATENT DOCUMENTS

| 8,395,736 | B2 | 3/2013 | Shin |
| 2005/0146662 | A1 | 7/2005 | Inoue |
| 2009/0195746 | A1 | 8/2009 | Chu |
| 2013/0176521 | A1* | 7/2013 | Jung ................. G02F 1/133788 349/128 |

FOREIGN PATENT DOCUMENTS

| CN | 2001166309 A | 6/2001 |
| CN | 1627156 A | 5/2005 |
| CN | 101498866 A | 8/2009 |
| CN | 101762909 A | 6/2010 |

* cited by examiner

*Primary Examiner* — Steven H Whitesell Gordon
(74) *Attorney, Agent, or Firm* — Andrew C. Cheng

(57) ABSTRACT

An optical alignment device and method are disclosed. The optical alignment device includes an aligned light source, a carrying mechanism, a masking mechanism, and a transporting mechanism. The carrying mechanism is spaced apart from the aligned light source. The transporting mechanism is for driving the masking mechanism such that when the aligned light source is applied to the substrate carried by the carrying mechanism, the masking mechanism is controlled by the transporting mechanism to block a first area such that the optical alignment process is switched from the first area to a second area.

10 Claims, 3 Drawing Sheets

OPTICAL ALIGNMENT DEVICE AND THE METHOD THEREOF

BACKGROUND OF THE INVENTION

1. Field of the Invention

The present disclosure relates to liquid crystal display (LCD) technology, and more particularly to an optical alignment device for liquid crystal substrates and the method thereof.

2. Discussion of the Related Art

With the technology evolution, LCDs are characterized by attributes including thin and light structure, power-saving, and low radiation. These attributes contribute to the wide adoption of the LCDs, such as IVs, computers, and cellular phones.

Currently, optical or friction alignment process are applied to the liquid crystal substrates such that the liquid crystal has an initial pretile angle before a driving voltage is provided. However, in the manufacturing process, the liquid crystal substrate has to be cut for testing or to be liquid crystal panels of the liquid crystal displays. Thus, applying an uniform optical alignment to the whole liquid crystal substrate cannot meet various demands.

SUMMARY

The object of the invention is to provide an optical alignment device and method for providing different alignment for the liquid crystal substrates.

In one aspect, an optical alignment device includes: an aligned light source, a carrying mechanism, a masking mechanism, and a transporting mechanism; the carrying mechanism is spaced apart from the aligned light source, the masking mechanism includes a substrate layer and a masking layer in a stack structure, the substrate layer is a glass substrate of a PVC (Polyvinylchloride) sheet, and the masking layer includes a black matrix (BM) or a metallic material disposed on the substrate layer; the transporting mechanism includes a connecting piece, a guiding piece, and a driving piece, the connecting piece connects to the masking mechanism, the guiding piece connects to the connecting piece, and the driving piece is for driving the connecting piece: and wherein the transporting mechanism is for driving the masking mechanism such that when the aligned light source is applied to the substrate carried by the carrying mechanism, the masking mechanism is controlled by the transporting mechanism to block a first area such that the optical alignment process is switched from the first area to a second area.

Wherein the optical alignment device further includes at least one first curing voltage output pin and at least one second curing voltage output pin, the second curing voltage outputs a second curing voltage to the second area when the optical alignment process is switched from the first area to the second area, and the first curing voltage outputs a first curing voltage to the first area when the optical alignment process is switched from the second area to the first area.

Wherein the first curing voltage is different from the second curing voltage, the first curing voltage and the aligned light source cooperatively perform the optical alignment process on the first area with the first pretile angle, and the second curing voltage and the aligned light source cooperatively perform the optical alignment process on the second area with the second pretile angle.

In another aspect, an optical alignment device includes: an aligned light source, a carrying mechanism, a masking mechanism, and a transporting mechanism, the carrying mechanism is spaced apart from the aligned light source, the transporting mechanism is for driving the masking mechanism such that when the aligned light source is applied to the substrate carried by the carrying mechanism, the masking mechanism is controlled by the transporting mechanism to block a first area such that the optical alignment process is switched from the first area to a second area.

Wherein the masking mechanism includes a substrate layer and a masking layer in a stack structure, the substrate layer is a glass substrate of a PVC (Polyvinylchloride) sheet, and the masking layer includes a black matrix (BM) or a metallic material disposed on the substrate layer.

Wherein the optical alignment device further includes at least one first curing voltage output pin and at least one second curing voltage output pin, the second curing voltage outputs a second curing voltage to the second area when the optical alignment process is switched from the first area to the second area, and the first curing voltage outputs a first curing voltage to the first area when the optical alignment process is switched from the second area to the first area.

Wherein the first curing voltage is different from the second curing voltage, the first curing voltage and the aligned light source cooperatively perform the optical alignment process on the first area with the first pretile angle, and the second curing voltage and the aligned light source cooperatively perform the optical alignment process on the second area with the second pretile angle.

Wherein the transporting mechanism includes a connecting piece for connecting the masking mechanism, a guiding piece for connecting to the connecting piece, and a driving piece for driving the connecting piece, and the driving piece drives the masking mechanism to be in a predetermined location to block the first area or the second area in accordance with the guiding piece.

Wherein the connecting piece is a rocker arm or a telescopic arm, the guiding piece is a sliding track or a lead crew passed through by the connecting piece, and the driving piece is a motor.

In another aspect, an optical alignment method in an optical alignment process using an aligned light source includes: driving a masking mechanism by a transporting mechanism to block a first area of a liquid crystal substrate carried by the transportation mechanism such that the optical alignment process is switched from the first area to a second area.

Wherein the masking mechanism includes a substrate layer and a masking layer in a stack structure, the substrate layer is a glass substrate of a PVC (Polyvinylchloride) sheet, the masking layer includes a black matrix (BM) or a metallic material disposed on the substrate layer, the driving step further includes driving the masking mechanism by the transporting mechanism to block the second area so as to switch the optical alignment process from the second area to the first area.

Wherein the driving step further includes: outputting a second curing voltage to the second area by at least one second curing voltage output pin of the optical alignment device so as to cooperatively performs the optical alignment process on the second area with the aligned light source when the optical alignment process is switched from the first area to the second area: and outputting a first curing voltage to the first area by at least one first curing voltage output pin of the optical alignment device so as to cooperatively performs the optical alignment process on the first area with the aligned light source when the optical alignment process is switched from the second area to the first area; and wherein the first curing voltage is different from the second curing voltage.

DETAILED DESCRIPTION OF THE EMBODIMENTS

Embodiments of the invention will now be described more fully hereinafter with reference to the accompanying drawings, in which embodiments of the invention are shown.

Figure 1:
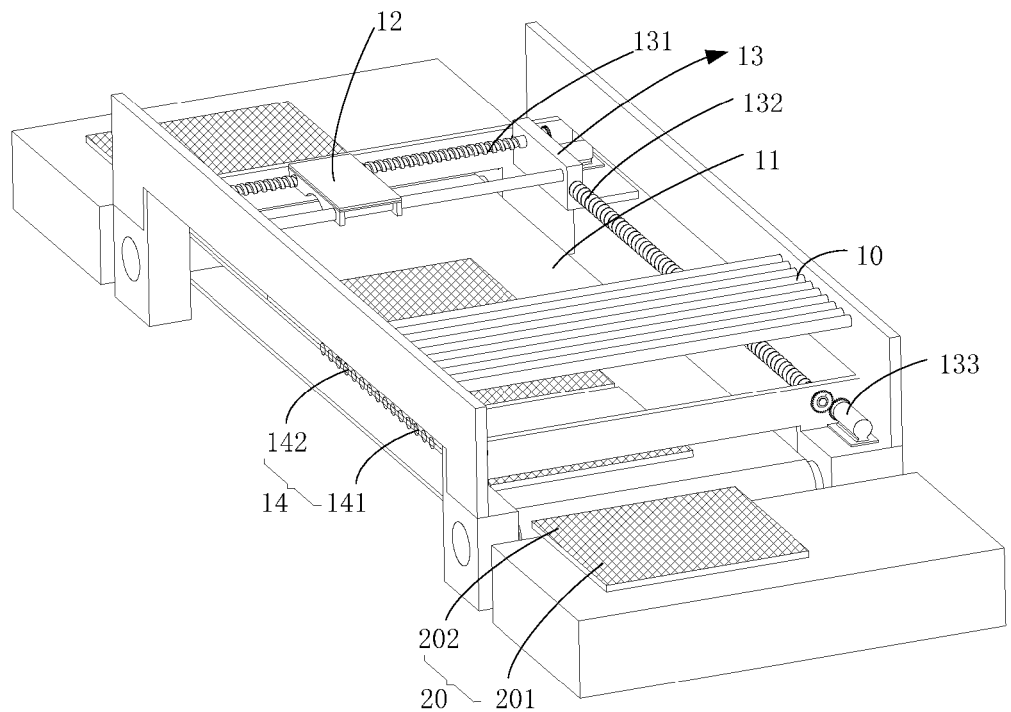
FIG. 1 is a schematic view of the optical alignment device in accordance with one embodiment, wherein the structure of the liquid crystal substrate is also shown.
Figure 2:
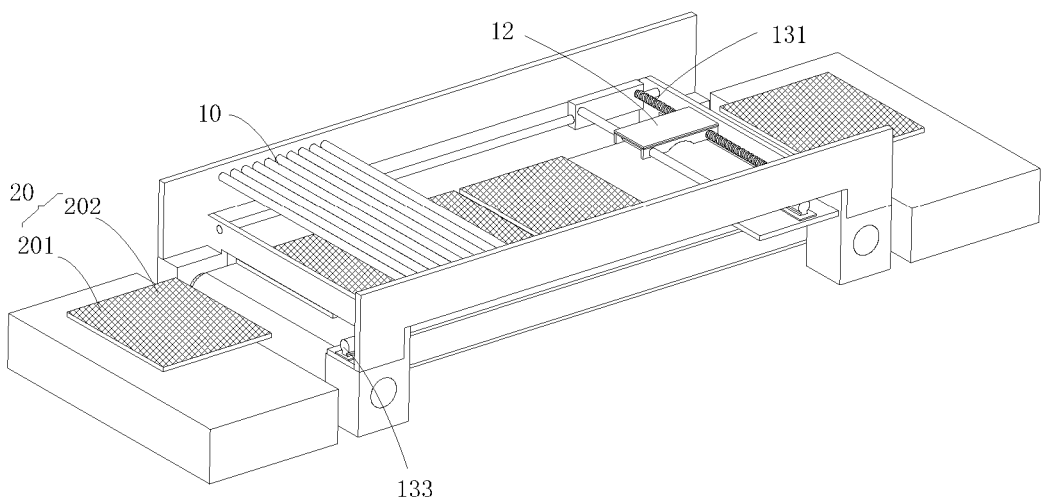
FIG. 2 is a schematic view of the optical alignment device of FIG. 1 viewed from another angle.
Figure 3:
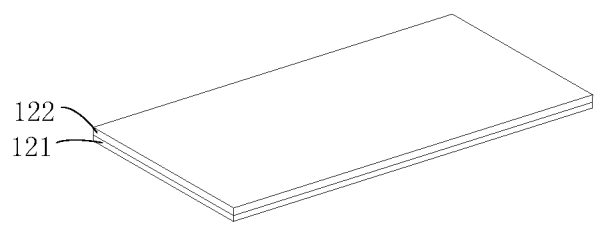
FIG. 3 is a schematic view of the masking mechanism of the optical alignment device of FIG. 1.

Referring to FIGS. 1, 2, and 3, the optical alignment device includes an aligned light source 10, a carrying mechanism 11, a masking mechanism 12, a transporting mechanism 13, and at least one output pin of the curing voltage 14. The optical alignment device performs the optical alignment process on a substrate 20.

The aligned light source 10 may be ultraviolet (UV) rays. The UV rays may, but not limited to, be light bars arranged in a row or be lighting chips arranged in a matrix.

The carrying mechanism 11 is spaced apart from the aligned light source 10. The carrying mechanism 11 is for carrying and fixing the substrate 20. Specifically, the substrate 20 is transported to a corresponding location below the aligned light source 10 for assembly.

The masking mechanism 12 may be made by material with low reflectance transparent material or by non-transparent material. The shape of the masking mechanism 12 is designed in accordance with the usage or mode of the substrate 20. For example, a plurality of different masking mechanisms 12 may be arranged. It is to be noted that the dimension of the masking mechanism 12 may be of a range of between ¼ and ⅙ of the dimension of an optical alignment area of the substrate 20, such as ⅕. As such, the locations of the masking mechanism 12 may be feasible adjusted in the masking process. In addition, the initial location of the masking mechanism 12 may be outside of the optical alignment area, which relates to the area for which the aligned light source 10 performs the optical alignment process. When the optical alignment process begins, the masking mechanism 12 is then moved to the optical alignment area to perform masking.

It is to be noted that the masking mechanism 12 includes a substrate layer 121 and a masking layer 122 in a stack structure, as shown in FIG. 3. Specifically, the substrate layer 121 may be a glass substrate of a PVC (Polyvinylchloride) sheet. The masking layer 122 includes a black matrix (BM) material or a metallic material disposed on the substrate layer. Preferably, the masking layer 122 is the BM matrix. Specifically, the chromium (Cr) is sputtered on the substrate 20. In other embodiments, the masking layer 122 may be made by photoresist resin containing black dying via photolithography method. The masking layer 122 is capable of preventing the aligned light source 10 from passing through the masking mechanism 12 and performs optical alignment process on a specific area of the substrate 20. In addition, the shape of the masking mechanism 12 may be, but not limited to, rectangular-shaped or circle-shaped. Similarly, the thickness of the masking mechanism 12 may be also adjusted.

The transporting mechanism 13 is for driving the masking mechanism 12. In one embodiment, the transporting mechanism 13 may be a robot arm for grabbing the masking mechanism 12 to a predetermined location. Specifically, the transporting mechanism 13 includes a connecting piece 131, a guiding piece 132, and a driving piece 133. The connecting piece 131 connects to the masking mechanism 12, the guiding piece 132 connects to the connecting piece 131. The driving piece 133 connects to the connecting piece 131 and drives the masking mechanism 12 to be in the predetermined location so as to block a first area 201 or a second area 202 in accordance with the guiding piece 132.

In one embodiment, the connecting piece 131 may be a lead screw, a rocker arm, or a telescopic arm. The masking mechanism 12 may be moved in a rocking manner or be moved along a line direction while being grabbed by the connecting piece 131. In other embodiments, the connecting piece 131 may be an assembly incorporating the rocker arm and the telescopic arm at the same time. In one embodiment, the guiding piece 132 may be a sliding track such that the connecting piece 131 drives the driven masking mechanism 12 to be the predetermined location in accordance with the direction of the sliding track. In other embodiments, the guiding piece 132 may be the lead screw passed through by the connecting piece 131 such that the connecting piece 131 drives the masking mechanism 12 to be the predetermined location in accordance with the engagement of the lead screw and the screws of the connecting piece 131. The driving piece 133 may be, but not limited to, a motor, a pulley assembly, or an oil pump for driving the connecting piece 131 along the guiding piece 132.

The curing voltage output pins 14 are arranged on the carrying mechanism 11 for cooperatively performing the optical alignment process on the substrate 20 with the aligned light source 10. The curing voltage output pins 14 control the pretile angle of the liquid crystals within the substrate 20. It is to be noted that the curing voltage output pins 14 are electrically connected such that the same alignment voltage is output and thus the pretile angle are the same. In other embodiments, the curing voltage output pins 14 may be arranged separately so as to output different alignment voltage.

The optical alignment device further includes a control system (not shown) connects respectively to the aligned light source 10, the carrying mechanism 11, and the transporting mechanism 13 so as to control the operations therebetween. In one embodiment, the optical alignment device includes a plurality of masking mechanisms 12 and the dimension of the masking mechanisms 12 are different. Correspondingly, the control system is capable of selecting the masking mechanism 12 to perform masking in accordance with the dimension of the masking mechanism 12 and the modes of the substrate 20.

In one embodiment, the substrate 20 is divided into the first area 201 and the 20. In other embodiments, the substrate 20 may be divided to three, four, or even five areas. The operations of the optical alignment device will be described hereinafter. The transporting mechanism 13 drives the masking mechanism 12 to block the first area 201 of the substrate 20 so as to stop the optical alignment process on the first area 201. The optical alignment process is then performed on the second area 202. Afterward, the optical alignment process may be stopped or may be further applied to the first area 201.

It is to be noted that the curing voltage output pins 14 may be divided into a plurality of groups so as to provide different curing voltage for different locations of the substrate 20 or to support the substrate 20 with different dimensions or attributes.

In one embodiment, the curing voltage output pins 14 includes a first curing voltage output pin 141 and a second curing voltage output pin 142. When the optical alignment process is switched from the first area 201 to the second area 202, the second curing voltage output pin 142 outputs the second curing voltage to the second area 202. When the optical alignment process is switched from the second area 202 to the first area 201, the first curing voltage output pin 141 outputs the first curing voltage to the first area 201.

In one embodiment, the first curing voltage is different from the second curing voltage. As such, the first curing voltage and the aligned light source 10 cooperatively perform the optical alignment process on the first area 201 with the first pretile angle, and the second curing voltage and the aligned light source cooperatively perform the optical alignment process on the second area 202 with the second pretile angle. It can be understood that the first pretile angle is also different from the second pretile angle while performing the optical alignment process on the areas.

As stated above, the dimension of the masking mechanism 12 may be of the range between ¼ and ⅙ of the dimension of the optical alignment area of the substrate 20. If the optical alignment area relates to the whole substrate 20, the third, fourth, fifth curing voltage output pins are arranged correspondingly.

The optical alignment device adopts the transporting mechanism 13 to drive the masking mechanism 12 so as to temporarily suspend the optical alignment process performing on a specific area. Compared with the claimed invention, the conventional optical alignment device can only uniformly perform the optical alignment process on the substrate 20. In addition, the optical alignment device of the claimed invention may be applied to the substrates 20 with different dimensions and modes. Furthermore, the masking mechanism 12 is driven by the transporting mechanism 13, instead of being controlled by operators. Thus, the efficiency and the precision of the optical alignment process is enhanced.

Figure 4:
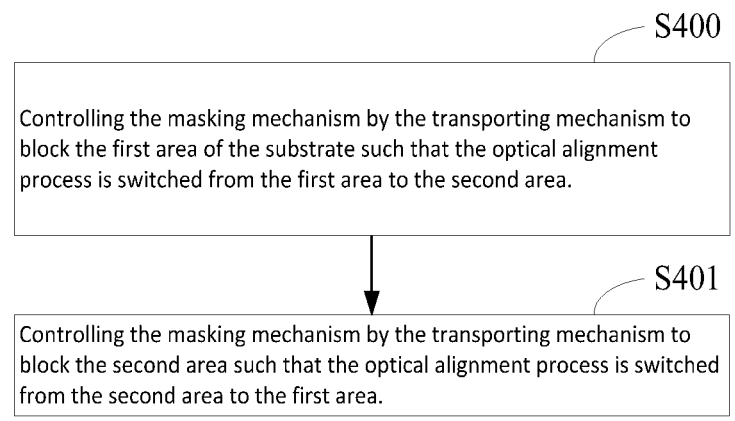
FIG. 4 is a flowchart illustrating an optical alignment method in accordance with one embodiment.

FIG. 4 is a flowchart illustrating an optical alignment method in accordance with one embodiment. The optical alignment method is performed by the above optical alignment device. The optical alignment method includes the following steps. In step S400, when the aligned light source is applied to the substrate carried by the carrying mechanism, the masking mechanism is controlled by the transporting mechanism to block the first area of the substrate such that the optical alignment process is switched from the first area to the second area.

In step S401, the transporting mechanism 13 controls the masking mechanism 12 to block the second area such that the optical alignment process is switched from the second area to the first area.

Figure 5:
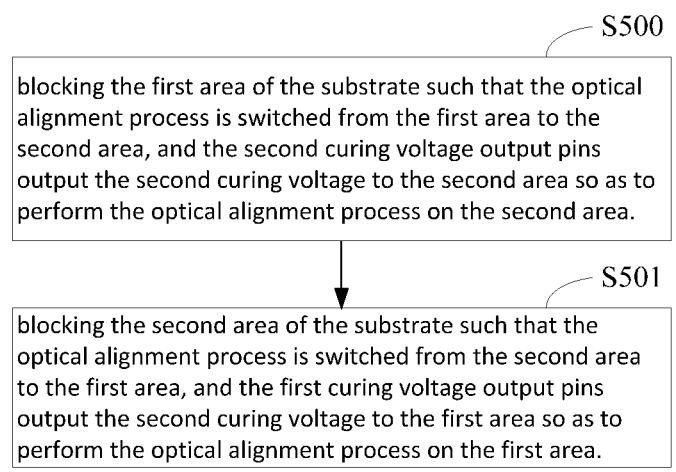
FIG. 5 is a flowchart illustrating an optical alignment method in accordance with another embodiment.

FIG. 5 is a flowchart illustrating an optical alignment method in accordance with another embodiment. The method includes the following steps. In step S500, when the aligned light source is applied to the substrate carried by the carrying mechanism, the masking mechanism is controlled by the transporting mechanism to block the first area of the substrate. The second curing voltage output pins of the optical alignment device outputs the second curing voltage to the second area so as to cooperatively operate with the aligned light source to perform the optical alignment process on the second area.

In step S501, the masking mechanism is controlled by the transporting mechanism to block the second area of the substrate. The first curing voltage output pins of the optical alignment device outputs the first curing voltage to the first area so as to cooperatively operate with the aligned light source to perform the optical alignment process on the first area.

The first curing voltage is different from the second curing voltage.

In one embodiment, a liquid crystal panel adopts the above optical alignment device and the optical alignment process. Preferably, the liquid crystal panel is Polymer Stabilize Vertical Align (PSVA) mode. It is understood that different alignment voltage may be configured in accordance with different modes of the PSVA liquid crystal panel.

In one embodiment, a liquid crystal panel includes the above liquid crystal panel and a backlight module.

In view of the above, the optical alignment process may be performed on the specific area of the substrate. Particularly, by adopting different curing voltage, the pretile angle of the liquid crystal in different area are controlled.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical alignment device, comprising:
   an aligned light source, a carrying mechanism, a masking mechanism, and a transporting mechanism;
   the carrying mechanism is spaced apart from the aligned light source, the masking mechanism comprises a substrate layer and a masking layer in a stack structure, the substrate layer is a glass substrate of a PVC (Polyvinylchloride) sheet, and the masking layer comprises a black matrix (BM) or a metallic material disposed on the substrate layer;
   the transporting mechanism comprises a connecting piece, a guiding piece, and a driving piece, the connecting piece connects to the masking mechanism, the guiding piece connects to the connecting piece, and the driving piece is for driving the connecting piece; and
   wherein the transporting mechanism is for driving the masking mechanism such that when the aligned light source is applied to a substrate carried by the carrying mechanism, the masking mechanism is controlled by the transporting mechanism to block a first area such that the optical alignment process is switched from the first area to a second area.

2. The optical alignment device as claimed in claim 1, wherein the optical alignment device further comprises at least one first curing voltage output pin and at least one second curing voltage output pin, the second curing voltage outputs a second curing voltage to the second area when the optical alignment process is switched from the first area to the second area, and the first curing voltage outputs a first curing voltage to the first area when the optical alignment process is switched from the second area to the first area.

3. The optical alignment device as claimed in claim 2, wherein the first curing voltage is different from the second curing voltage, the first curing voltage and the aligned light source cooperatively perform the optical alignment process on the first area with the first pretile angle, and the second curing voltage and the aligned light source cooperatively perform the optical alignment process on the second area with the second pretile angle.

4. An optical alignment device, comprising:
an aligned light source, a carrying mechanism, a masking mechanism, and a transporting mechanism, the carrying mechanism is spaced apart from the aligned light source, the transporting mechanism is for driving the masking mechanism such that when the aligned light source is applied to a substrate carried by the carrying mechanism, the masking mechanism is controlled by the transporting mechanism to block a first area such that the optical alignment process is switched from the first area to a second area; and
wherein the masking mechanism comprises a substrate layer and a masking layer in a stack structure, the substrate layer is a glass substrate of a PVC (Polyvinylchloride) sheet, and the masking layer comprises a black matrix (BM) or a metallic material disposed on the substrate layer.

5. The optical alignment device as claimed in claim 4, wherein the optical alignment device further comprises at least one first curing voltage output pin and at least one second curing voltage output pin, the second curing voltage outputs a second curing voltage to the second area when the optical alignment process is switched from the first area to the second area, and the first curing voltage outputs a first curing voltage to the first area when the optical alignment process is switched from the second area to the first area.

6. The optical alignment device as claimed in claim 4, wherein the first curing voltage is different from the second curing voltage, the first curing voltage and the aligned light source cooperatively perform the optical alignment process on the first area with the first pretile angle, and the second curing voltage and the aligned light source cooperatively perform the optical alignment process on the second area with the second pretile angle.

7. The optical alignment device as claimed in claim 4, wherein the transporting mechanism comprises a connecting piece for connecting the masking mechanism, a guiding piece for connecting to the connecting piece, and a driving piece for driving the connecting piece, and the driving piece drives the masking mechanism to be in a predetermined location to block the first area or the second area in accordance with the guiding piece.

8. The optical alignment device as claimed in claim 7, wherein the connecting piece is a rocker arm or a telescopic arm, the guiding piece is a sliding track or a lead crew passed through by the connecting piece, and the driving piece is a motor.

9. An optical alignment method in an optical alignment process using an aligned light source, comprising:
driving a masking mechanism by a transporting mechanism to block a first area of a liquid crystal substrate carried by the transportation mechanism such that the optical alignment process is switched from the first area to a second area; and
wherein the masking mechanism comprises a substrate layer and a masking layer in a stack structure, the substrate layer is a glass substrate of a PVC (Polyvinylchloride) sheet, the masking layer comprises a black matrix (BM) or a metallic material disposed on the substrate layer, the driving step further comprises driving the masking mechanism by the transporting mechanism to block the second area so as to switch the optical alignment process from the second area to the first area.

10. The optical alignment method as claimed in claim 9, wherein the driving step further comprises:
outputting a second curing voltage to the second area by at least one second curing voltage output pin of the optical alignment device so as to cooperatively performs the optical alignment process on the second area with the aligned light source when the optical alignment process is switched from the first area to the second area; and
outputting a first curing voltage to the first area by at least one first curing voltage output pin of the optical alignment device so as to cooperatively performs the optical alignment process on the first area with the aligned light source when the optical alignment process is switched from the second area to the first area; and
wherein the first curing voltage is different from the second curing voltage.

* * * * *